J. R. ANDERSON.
VARIABLE DROP MECHANISM.
APPLICATION FILED MAY 18, 1914.
1,215,607.
Patented Feb. 13, 1917.
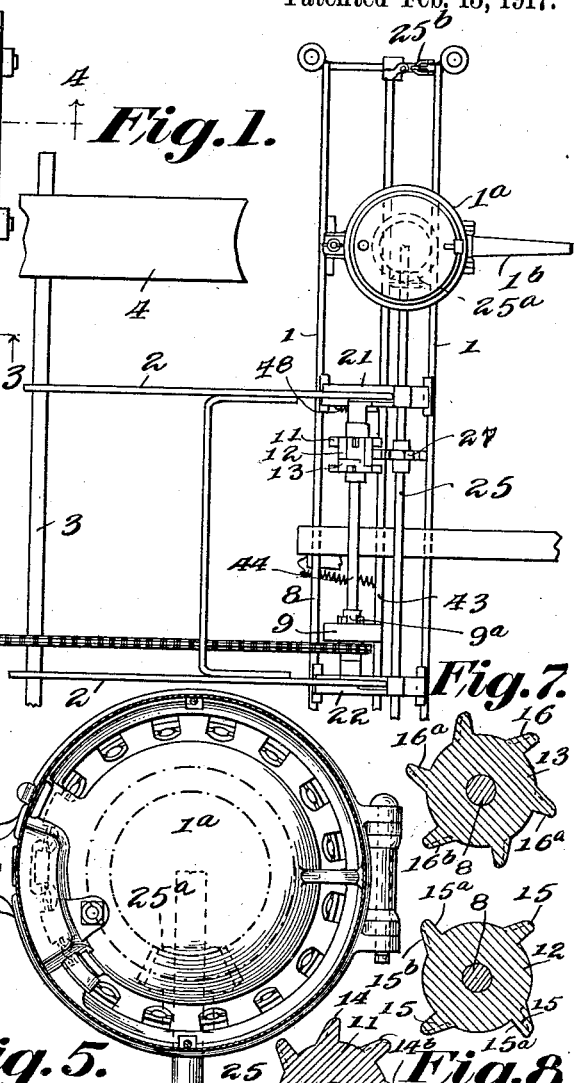
Fig.1.
Fig.7.
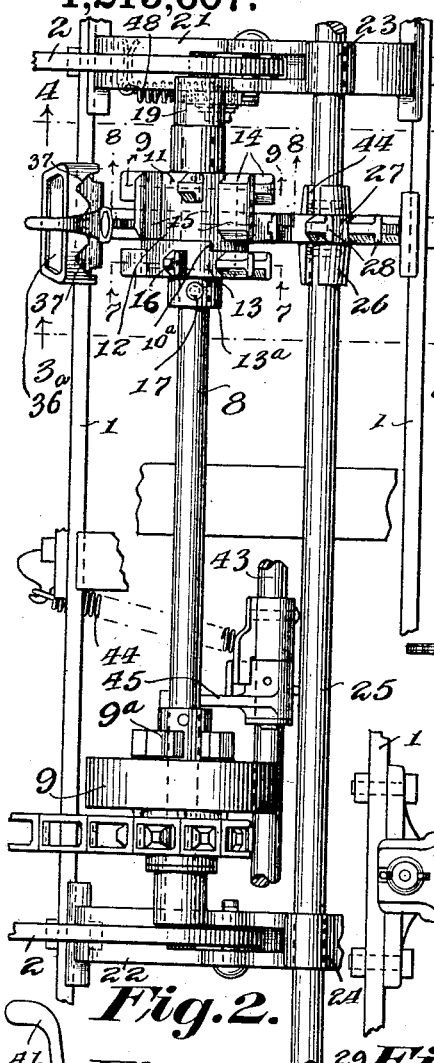
Fig.2.
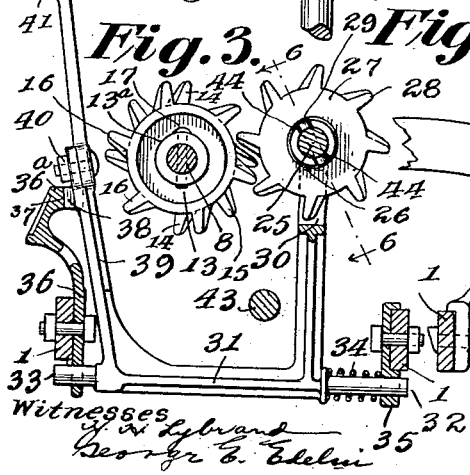
Fig.3. Fig.5. Fig.9.
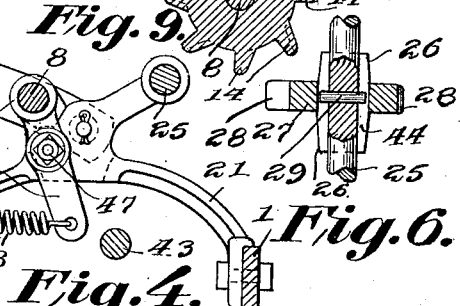
Fig.8. Fig.6. Fig.4.
Witnesses
Inventor
John R. Anderson
By H. H. Bliss Attorney
THE NORRIS PETERS CO., PHOTO-LITHO., WASHINGTON, D. C.

UNITED STATES PATENT OFFICE.

JOHN R. ANDERSON, OF MOLINE, ILLINOIS, ASSIGNOR TO DEERE & MANSUR COMPANY, OF MOLINE, ILLINOIS, A CORPORATION OF ILLINOIS.

VARIABLE-DROP MECHANISM.

1,215,607. Specification of Letters Patent. Patented Feb. 13, 1917.

Application filed May 18, 1914. Serial No. 839,421.

*To all whom it may concern:*

Be it known that I, JOHN R. ANDERSON, a citizen of the United States, residing at Moline, in the county of Rock Island and State of Illinois, have invented certain new and useful Improvements in Variable-Drop Mechanisms, of which the following is a specification, reference being had therein to the accompanying drawing.

This invention relates to improvements in planters, it pertaining more particularly to the devices by which the number of the seeds that are to be planted at any given time can be varied.

Figure 1 is a top plan, more or less diagrammatic, of parts of a planting mechanism embodying my improvements.

Fig. 2 is a plan view on a larger scale of parts of the mechanism.

Figs. 3 and 4 are sections on the lines 3—3 and 4—4 of Fig. 2.

Fig. 5 is a plan view of one of the seed-delivering mechanisms.

Figs. 6, 7, 8 and 9 are, respectively, sections taken on the line 6—6, Fig. 3, and lines 7—7, 8—8 and 9—9, Fig. 2.

The machine as an entirety has a front frame indicated by 1, 1, and the rear frame having the bars 2, 2, on axle 3, and wheels 4. The front frame carries two seeding mechanisms 1ª, below which are the furrow openers 1ᵇ and the shanks or boots.

The seeding mechanism can be of any well-known or preferred sort, provided it be adapted to select at each of its intermitting actuations, seeds, one by one, from an indiscriminate mass. As indicated in Fig. 5, the essential part is an intermittingly rotating plate with peripheral cells each adapted to receive a kernel and carry it under the cut-off to the point of delivery. To this seeding mechanism intermitting movements are imparted by the shaft 25 and gearing at 25ª. This shaft has a half revolution imparted to it when the fork 25ᵇ is rocked backward by a tappet on the check row wire. The tappet rocks the shaft 43 in one direction and the spring 44 returns it; and as it rocks back its stop arm 45 allows the clutch element 9ª to engage with the continuously rotating clutch element 9 constantly driven from the axle. When the tappet escapes from the fork 25ᵇ, and arm 45 is brought back to its normal position by spring 44, the clutch element 9ª is disengaged at the end of a half revolution of the shaft 8. Through transmitting devices interposed between the shafts 8 and 25, movement is carried from the former to the seed plate at 1ª.

Further description and detail of the clutch mechanism and the tappet devices is not necessary, as such mechanisms are now well-known and here referred to merely to give clear understanding of the relationships and operations of these parts, as concerns the hill-varying mechanism.

Under most circumstances, it is desirable to deposit in each hill three kernels; but sometimes it is preferable to deposit two at a hill, and sometimes four. The parts more closely involved in the present improvements are the devices by which the driver is enabled at any instant to vary the numbers of kernels that are to be dropped by the seeder; these devices being the following:

21 and 22 are brackets rigidly secured to the front frame bars 1, 1, these being the parts to which the bars 2, 2, of the rear frame are hinged. In these brackets 21, 22, the seeder driving shaft 25 is mounted in bearings 23 and 24. And they furnish support also for the countershaft 8 which carries the clutch elements and the hill-varying devices.

The latter comprises three sets of teeth at 14, 15 and 16 (carried by the shaft 8) and the transversely movable set of teeth 27. The teeth of the three sets first mentioned can be provided by forming them on three separate hubs and securing them close together on the shaft 8; but I prefer to form them as two castings, one having the elongated hub part 11, 12 and the other having the hub part 13. The part 11 of the elongated hub has eight equi-distant teeth 14, 14, spaced 45 degrees apart; and the part 12 has four teeth 15, 90 degrees apart. The teeth 15 are shown as axial extensions of the teeth 16. The hub 13 has six teeth 16, 16, which are spaced 60 degrees apart. It is shouldered at 10ª to provide a peripheral lock with the hub 12. 13ª is a boss on the hub 13, and 17 is a set screw for fastening it to the shaft 8.

Of the driven teeth 28 there are eight. They are carried by a disk 27 with an elongated central hub 26 which is fitted loosely to the shaft 25, so that the disk can be moved axially along the shaft. 29 is a feather pin or spline secured to the shaft 25 and engaging loosely with the walls of the slots 44 in the center hub sleeve 26.

The disk 27 with its teeth 28 can be moved axially along the shaft 25 by the shifting fork 30 which is carried by the shaft 31 having its ends 32 and 33 mounted in brackets 35 and 36. 39 is a lever secured to or formed with the shaft 31 and extending up far enough to be accessible to the foot or hand of the driver. The shaft 31 can be pushed axially in the brackets 32 and 33, but is normally held in its rearmost position by a spring 34. The bracket 36 carries a plate 36ª which is provided with notches 37. 38 is a detent fastened at 40 to the lever 39.

It will be seen that the driver can push shaft 31 far enough to release the detent 38 and can then rock the shaft and the shifting fork 30 and thereby move the toothed disk 27 along shaft 25 to bring it into the planes of engagement of teeth 15 (as shown in Fig. 1) or in the planes of the teeth 16, or those of the teeth 14.

There being eight teeth 28 in the driven series, it will be further seen that when they are in engagement with the teeth 15 (of which there are four) a half revolution of shaft 8 will impart one-half of a revolution to shaft 25. The gearing at 25ª is of such ratio that for each one-quarter of a revolution of the shaft 25, the seed plate will be advanced a distance equal to the distance between two of the seed cells. Hence when the teeth 15 are in action upon the disk 27, the seed plate will be advanced two cell distances at each actuation of the tappet.

When the eight driven teeth 28 are in the planes of the teeth 16 (the driving series of six) the half revolution of the shaft 8 will impart three-eighths of a revolution to the seeder shaft 25 and three cells of the delivering mechanism will be brought to the place of discharge.

When the driven element 27 is brought into the planes of the teeth 14 (of which there are eight) the half revolution of the shaft 8 will be answered by a half revolution of the seeder shaft 25 and four kernels will be delivered.

I am aware of the fact that hill-varying devices have been heretofore designed in which use was made of variable gear drivers. In some instances there were three or more pairs of intermeshing gears, the mates of each pair meshing together constantly. At lines near the axis of one of the shafts a shifting spline or projection was placed adapted to engage with one or another of the wheels mounted on that shaft. In other cases the shafts have been arranged at right angles to each other and one of them has been provided with a series of large bevel gears, and the other with a sliding bevel pinion.

Difficulties have been met with in using hill-varying mechanisms of any of these earlier sorts. The diameters of the gear wheels are necessarily limited. If the shifting device is near the shaft, it rotates on a short radius, and if, to seat itself and travel in and travel along one of the passageways in one of the wheels, it becomes necessary to turn the wheel or the shifter, even a few degrees, there is danger of varying the position of the seed plate. The shifting key or clutch piece is generally beveled or chamfered in such way as to throw one or the other of the engaging parts slightly around the axis. And when it is close to the axis the extent of peripheral travel is relatively multiplied.

I have overcome these objections by arranging the teeth of the driving element and of the driven element in the way shown. They are made large so that they can stand lateral blows without danger of breakage, all small and delicate parts being eliminated. They project outwardly from the periphery, and those faces which engage are flat and approximately radial, the opposite faces on all of the teeth being chamfered or beveled at the edges and rounded at the backs. When the parts are initially assembled, the teeth of the shiftable element are so positioned that they have wide spaces to move in from one end of the series to the other; but if under any circumstances the edges of the teeth on the shifting element should strike the teeth of the companion element, the contact is taken by the cam surfaces and the shifting element can yield peripherally sufficiently to readily pass over an opposite driving tooth. A slight amount of lost motion is provided for the pin 29 in the slot; but as the cams at the backs of the teeth are at the periphery, and not near the axis, the play of the part 27 is not sufficient to throw the seed plate to a position of inaccuracy. The flat faces of the teeth are shown at 14ª, 15ª and 16ª. The thickened and chamfered parts are shown at 14ᵇ, 15ᵇ and 16ᵇ.

Then, to insure that there shall be no breakage under any circumstances whatever, I support one of the hill-varying elements yieldingly. As shown, the driving element is arranged to yield. The bearing 19 of the shaft 8 is on the end of a movable arm 46, pivoted at 47 to the bracket 21 and held in normal position by a spring 48. When from any cause there is cramping or binding between the driving and the driven elements of the hill-varying device, the pressure is immediately relieved by a slight backward movement of the shaft 8 and the driving parts attached thereto.

The manner in which the devices above described operate will be readily understood.

When the parts are positioned in the way shown in Figs. 2 and 3, the transmitting devices between the shafts 8 and 25 will, as above described, cause two seeds in the seeder cells to pass under the cut-off. If the operator desires to vary the number of kernels, for example, to have the machine drop three to the hill, he, with his hand or his foot, presses on the left hand side of the lever 41 and the detent 38 rides up out of the middle notch 37 and seats itself in the right hand notch, the shaft 31 rocking and the fork 34 moving the driven element 27 over until its teeth or projections aline with those at 16; and thereafter three seed cells will be carried under the cut-off. If he should desire to drop four kernels to the hill, he presses the lever 41 toward the left until it is seated in the left hand notch 37, this bringing the driven element 27 into alinement with the eight driving teeth 14; thereafter, at each actuation of the tappet, four seed cells will pass under the cut-off until another adjustment has been made.

What I claim is:

1. In a planter, the combination of the seed-delivering mechanisms one at each side of the machine, the intermittingly actuated devices for delivering from each seeder mechanism at each actuation a series of seeds one by one, a longitudinally stationary seeder shaft connected by fixed gear to both of said seeder mechanisms, a continuously acting driver, a countershaft, means for taking a predetermined fixed movement from the said driver to the countershaft, three differing sets of driving teeth or projections on the countershaft, the teeth of each set being uniformly spaced around said shaft and all said teeth being rotatable in equal circles of rotation, an adjustable set of driven teeth slidably mounted on the seeder shaft, and a lever for bodily shifting said adjustable set of teeth relatively to the seeder shaft and from a position of engagement with the teeth of one of the aforesaid sets to a position of engagement with the teeth of another set.

2. In a planter, the combination of intermittingly actuated devices for delivering at each actuation a series of seeds, one by one, a continuously acting driver, means for taking a predetermined fixed movement from the said driver, power transmitting mechanism between said driver and the seed-delivering devices comprising a driving and a driven element, of which one is held yieldingly bodily in relation to the other, and one of which is provided with two or more varying sets of teeth, and the other of which has a single series of bodily adjustable teeth.

3. The combination of the seeding mechanism, the seeder shaft, the counter shaft for driving the seeder shaft and the interposed transmission gearing comprising an adjustable toothed gear member, and a companion toothed gear member having an axially extended series of differing sets of teeth, the teeth of the transmission gearing each having a flat side for operative engagement with an opposing tooth, and having its back surface formed with chamfered end edges to permit one tooth to pass another axially.

4. The combination of the seeding mechanism, the seeder shaft, the counter shaft, means for intermittingly rotating the counter shaft, the variable transmission gearing connecting the shafts and the yielding support for one of said shafts held normally in predetermined operative position.

5. The combination of the seeding mechanism, the seeder shaft, the counter shaft, the power devices at one end of and for rotating the counter shaft, the variable transmission gearing between said shafts and connected with the opposite end of the counter shaft, and yielding means for holding in predetermined operative position the last said end of the counter shaft.

In testimony whereof, I affix my signature, in presence of two witnesses.

JOHN R. ANDERSON.

Witnesses:
O. F. LUNDAHL,
C. R. BOHMAN.

Copies of this patent may be obtained for five cents each, by addressing the "Commissioner of Patents, Washington, D. C."